No. 637,653. Patented Nov. 21, 1899.
N. E. PARISH.
APPARATUS FOR MAKING SPROCKET WHEELS.
(Application filed Apr. 23, 1897.)
(No Model.) 3 Sheets—Sheet 1.
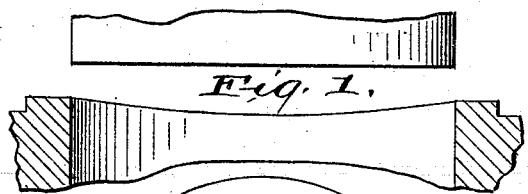
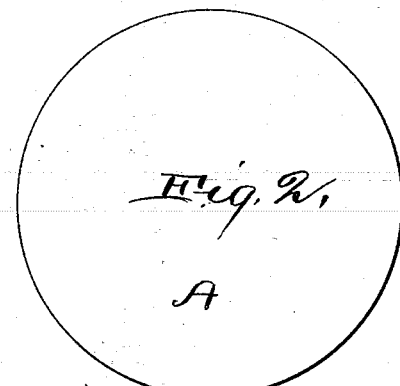
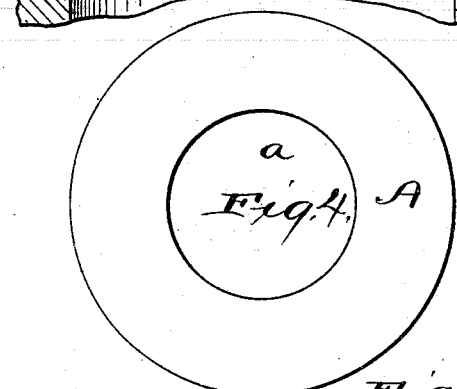
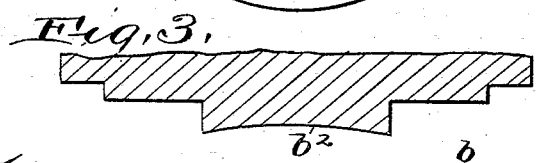
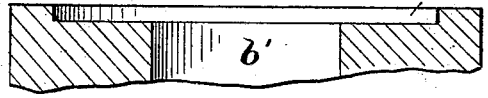
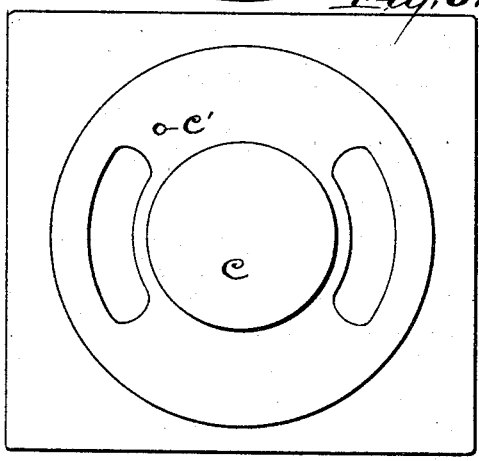
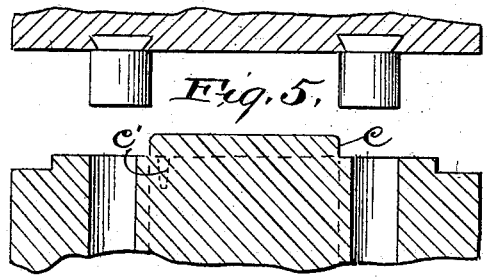
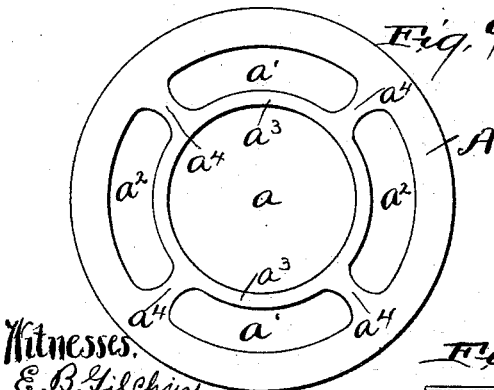
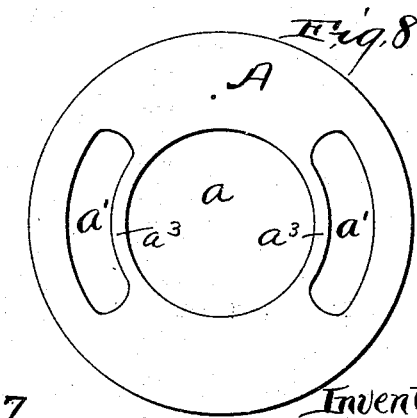
Witnesses:
E. B. Gilchrist
H. M. Hutchison
Inventor:
Neff E. Parish,
By his attorneys,
Thurston & Bates.
THE NORRIS PETERS CO., PHOTO-LITHO., WASHINGTON, D. C.

No. 637,653. Patented Nov. 21, 1899.
N. E. PARISH.
APPARATUS FOR MAKING SPROCKET WHEELS.
(Application filed Apr. 23, 1897.)
(No Model.) 3 Sheets—Sheet 2.
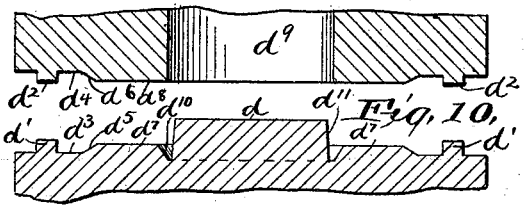
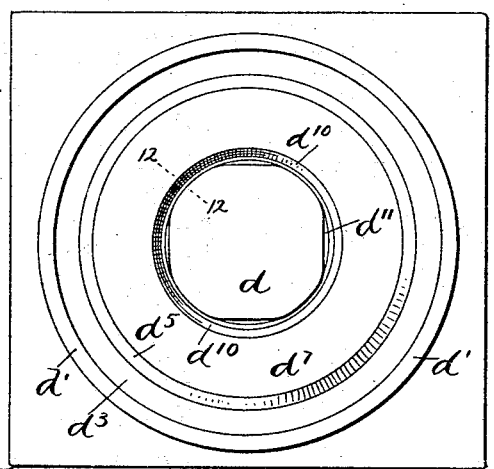
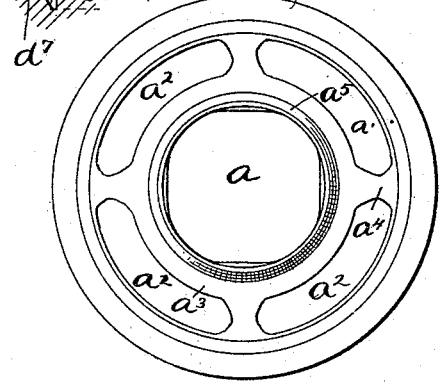
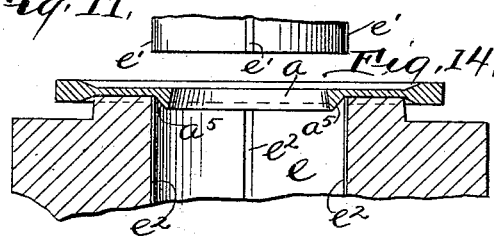
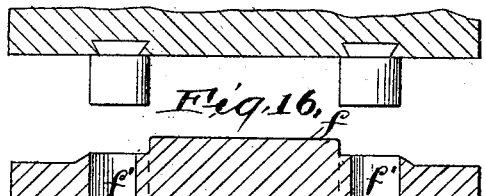
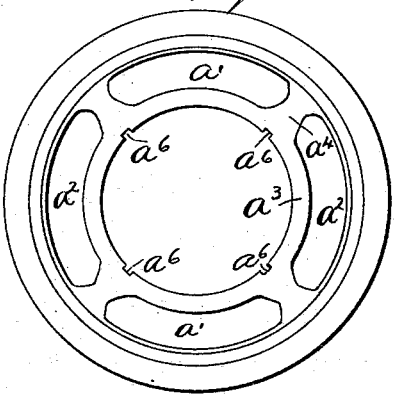
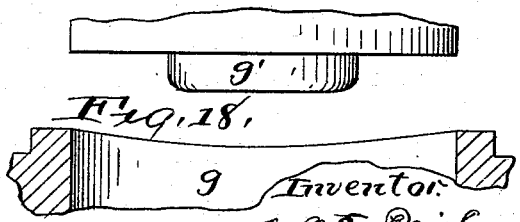
Witnesses:
E. B. Gilchrist
H. M. Hutchison
Inventor:
Neff E. Parish,
By his Attorneys,
Thurston & Bates No. 637,653. Patented Nov. 21, 1899.
N. E. PARISH.
APPARATUS FOR MAKING SPROCKET WHEELS.
(Application filed Apr. 23, 1897.)
(No Model.) 3 Sheets—Sheet 3.
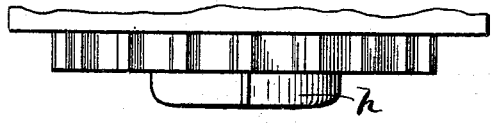
Fig. 19.
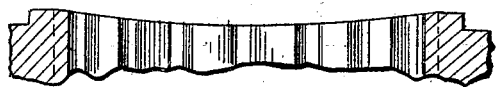
Fig. 21.
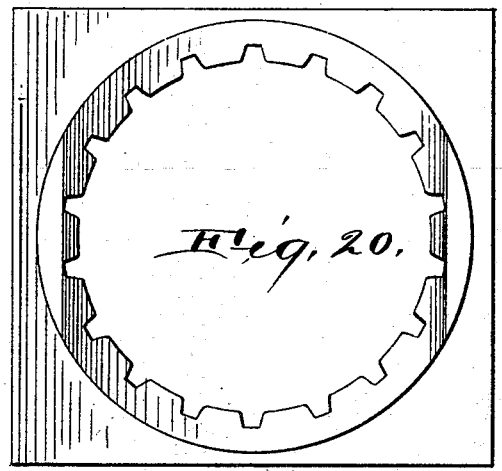
Fig. 20.
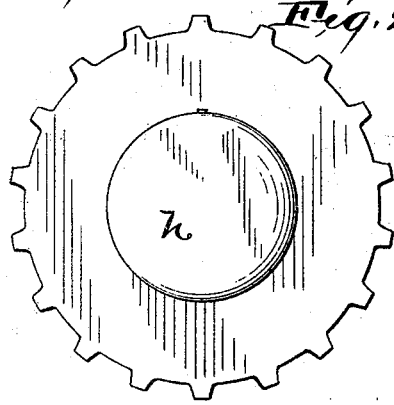
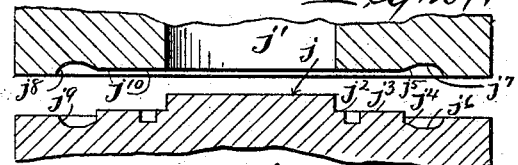
Fig. 24.
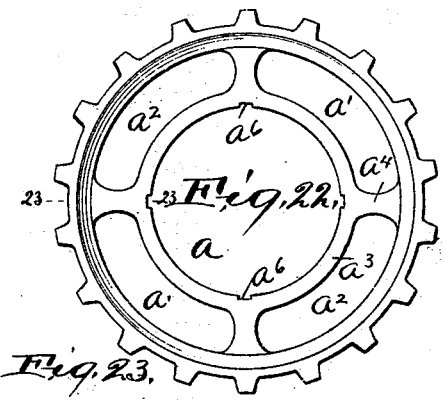
Fig. 22.
Fig. 23.
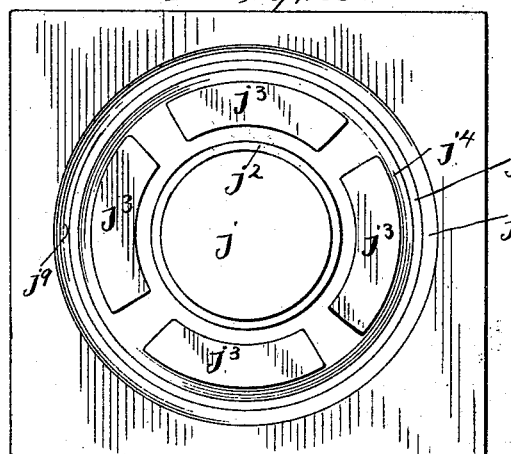
Fig. 25.
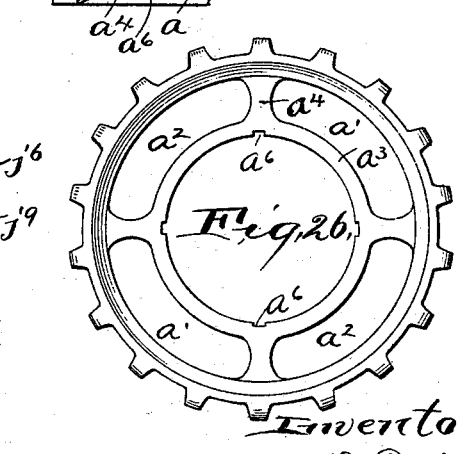
Fig. 26.
Fig. 27.
Witnesses:
E. B. Gilchrist
N. M. Hutchison
Inventor:
Neff E. Parish,
By his Attorneys,
Thurston & Bates.
THE NORRIS PETERS CO., PHOTO-LITHO., WASHINGTON, D. C.

UNITED STATES PATENT OFFICE.

NEFF E. PARISH, OF CLEVELAND, OHIO, ASSIGNOR TO THE PARISH & BINGHAM COMPANY, OF SAME PLACE.

APPARATUS FOR MAKING SPROCKET-WHEELS.

SPECIFICATION forming part of Letters Patent No. 637,653, dated November 21, 1899.

Application filed April 23, 1897. Serial No. 633,445. (No model.)

*To all whom it may concern:*

Be it known that I, NEFF E. PARISH, a citizen of the United States, residing at Cleveland, in the county of Cuyahoga and State of Ohio, have invented certain new and useful Improvements in Apparatus for Making Sprocket-Wheels, (Case B;) and I do hereby declare the following to be a full, clear, and exact description of the invention, such as will enable others skilled in the art to which it appertains to make and use the same.

The object of my invention is to provide a cheap and efficient apparatus for making sprocket-wheels of sheet metal.

Figure 1 is a sectional elevation of the first pair of dies employed, and Fig. 2 is a plan of the product resulting from them. Fig. 3 is a vertical central section of the second pair of dies, and Fig. 4 a plan of their product. Fig. 5 is a vertical central section of the pair of dies next employed, Fig. 6 a plan of the lower die, and Fig. 7 a side elevation of one of the plungers carried by the upper die. This pair of dies operates twice upon the blank, the second time with the blank turned horizontally about its center a distance of ninety degrees. Fig. 8 shows the product resulting from the first operation, and Fig. 9 that resulting from the second. Fig. 10 is a vertical central section of the pair of dies next employed, which do the compressing. Fig. 11 is a plan of the lower die shown in Fig. 10; Fig. 12, a vertical section on line 12 12 of Fig. 11, and Fig. 13 is a bottom plan of the blank after the operation of these dies. Fig. 14 is a vertical central section of the pair of dies next employed, the blank being shown in position ready for the descension of the upper die, and Fig. 15 is a plan of the blank after this operation. Fig. 16 is a vertical central section of the next dies, which trim out the spokes. These dies operate twice upon the blank in the same manner as the dies shown in Figs. 6 and 7. Fig. 17 shows the blank after the second of these operations. Fig. 18 is a sectional elevation of the pair of dies next employed, which trim off the outside of the blank, leaving it as shown in Fig. 17, except with a slightly-narrower rim. Fig. 19 is a sectional elevation of the dies which punch the teeth and which are next used; Fig. 20, a plan of the lower die; Fig. 21, a bottom plan of the upper die; Fig. 22, a plan of the blank after the operation of these dies, and Fig. 23 a transverse section of the same on the line 23 23 of Fig. 22. Fig. 24 is a vertical central section of the pair of dies employed for forming the teeth—that is, for rounding them off; Fig. 25, a plan of the lower die shown in Fig. 24; and Fig. 26, a plan of the finished wheel as it results from the operation of these last dies, Fig. 27 being a central transverse section of the same.

The specific operation of the invention as illustrated in the drawings will now be described.

A piece of sheet-steel is placed between the dies shown in Fig. 1 and the round disk A punched out. The diameter of this disk is substantially the same as that of the imaginary circle which incloses the finished wheel, the "top circle," as it is called in gear-wheel nomenclature. The disk is then placed within the cup $b$, formed in the lower one of the second pair of dies, which cup closely embraces the periphery of the disk and centers it over the hole $b'$ in the lower die. Thereupon the male die $b^2$ descends upon the plate and punches a hole $a$ through its center. The blank is now in the form shown in Fig. 4. In this condition it is placed around the pilot $c$, which projects upward from the lower die shown in Fig. 5 and is the same in diameter as the hole $a$. The upper die now descends upon the blank and punches out two of the openings $a'$, which are to define the spokes and web, leaving the blank in the form shown in Fig. 8. A small hole $c'$ extends downward a short distance from the surface of the lower die, and into this hole is now placed a small pin, and the blank is again placed on the lower die in a position at right angles to its former position, the pin projecting through one of the holes $a'$ and bearing against the end thereof, and thus defining the position of the blank. The upper die now descends and two more portions, as $a^2 a^2$, are punched out. This leaves the blank in the form shown in Fig 9, having the circular web $a^3$ and the spokes $a^4$. The compressing-dies shown in Fig. 10 are now used. The lower of these dies has a pilot $d$ projecting upward from it. This pilot is somewhat smaller than the hole through the die. An annular flange $d'$ projects upward from the lower die, and one, $d^2$, projects downward from the upper die. The diametric distance across the circle inclosed by either of these flanges is a little greater than the diameter of the finished wheel. Just inside of these flanges the dies have the plane annular portions $d^3$ $d^4$, which form the outer part of the wheel-rim, and just inside of these flat portions are the beveled portions $d^5$ $d^6$, which define the inner part of the rim of the wheel. Inside of these beveled surfaces are the plane surfaces $d^7$ $d^8$, the former of which extends to the hole $d^9$ in the upper die and the latter of which terminates in the groove $d^{10}$, which surrounds the pilot $d$. The blank is placed over the lower die and properly centered by a suitable gage, which preferably consists of a sleeve closely surrounding the pilot and having its external diameter the same as the diameter of the hole $a$ in the blank, which sleeve is removed before the operation begins. The upper die now descends, the hole $d^9$ coming over the pilot and the surfaces $d^7$ $d^8$ compressing the blank between them. This compression causes the metal to flow inward around the pilot $d$ and into the groove $d^{10}$, and thus forms a flash $a^5$ on the under side of the wheel around the hole $a$. The compression also makes the metal flow from all directions toward the holes $a'$ $a^2$, thereby rendering them smaller, and outward until limited by the flanges $d'$ $d^2$. These flanges are not absolutely necessary and may be omitted, though I prefer to use them to prevent the metal flowing so rapidly as not to accurately form the beveled surface corresponding to the die portions $d^5$ $d^6$. It will be noticed that this pilot $d$ is not perfectly cylindrical, but is squared off, as shown at $d^{11}$, at points which come opposite to the spokes. This is so that there may be ample room for the metal to flow inward at these points where there is no hole opposite. The surfaces which cause this squaring are substantially planes which incline outwardly a little as they descend, and at their lower ends approach the general cylindrical form of the pilot. The compression which is given the blank by the dies just described leaves it in the form shown in bottom plan in Fig. 13 and in section in Fig. 14. The line in which the outer surface of the flash $a^5$ joins the lower side of the wheel is a circle, the same in diameter as the hole in the finished wheel. The blank is now placed over the lower die shown in Fig. 14, and is accurately centered over the hole $e$ in said die by means of the flash $a^5$, as shown. The upper die now descends and punches out the flash $a^5$, leaving the hole $a$ in its final form. If it is desired to have notches $a^6$, formed in the web of the wheel for the purpose of meshing with the spider-arm, these notches are punched at this operation by the rib $e'$ in the upper die, which enter grooves $e^2$ in the lower die. The blank is now as shown in Fig. 15. It is placed over the pilot $f$ in Fig. 16 and brought to proper position over the holes $f'$ in the lower die by means of a pin projecting upward from that die at a proper point or by means of a rib on the pilot, which fits one of the notches $a^6$. The upper die then descends and trims out two of the spaces $a'$ between the spokes, rim, and web, and then the blank is turned ninety degrees and the spaces $a^2$ $a^2$ are likewise trimmed. The blank is in the form shown in Fig. 17 when it leaves these dies. The blank is now placed between the dies shown in Fig. 18, and is properly centered over the hole $g$ in the lower die by means of the pilot $g'$ projecting downward from the upper die, which pilot is the same in diameter as the hole through the blank. The diameter of the hole $g$ is the same as that of the disk A as first punched. The descension of the upper die trims off the outside of the blank to a proper size for punching the teeth. The next operation is to punch the teeth. This is done by the dies shown in Figs. 19, 20, and 21. The blank is placed between the pair of dies and is properly centered by the pilot $h$, which projects downward from the upper die. When the die descends, it punches notches out of the periphery of the blank, which leave the sprocket-teeth between them.

Figs. 22 and 23 show the blank as it comes from the dies just described. It is now placed between the final pair of dies. (Shown in Figs. 24 and 25. The lower one of these dies has a pilot $j$, adapted to project into a hole $j'$ in the upper die, and thus guide that die. This pilot is enlarged at its base, having the cylindrical surface $j^2$, which the blank can tightly fit. Projecting upward from this die are the blocks $j^3$, of such size as to tightly fit into the openings $a'$ $a^2$ in the blank. Beyond these blocks each die has, first, a beveled surface, as $j^4$ $j^5$, then a plane surface, as $j^6$ $j^7$, and then a surface $j^8$ $j^9$, curving to the plane of the die. These three surfaces are similar in the two dies, and the spaces between them when the upper die is resting upon the lower is the same as the section of the rim of the finished wheel. When the upper die descends upon the blank properly placed over the lower, the teeth are rounded off and flow radially a little (as far as the walls of the dies allow) and also flow circumferentially. The result is that these dies form the teeth in the proper manner, while the blocks $j^3$ and the surface $j^2$ at the base of the pilot prevent the distortion of the web and spokes of the wheel.

Figs. 26 and 27 show the wheel as it comes from these last dies, which is in the form to which I refer herein as being the "finished wheel" and in which form I am furnishing these wheels to bicycle-builders. The pressure applied to the wheel-blank by the compressing operation refines the material and renders it stronger and harder and tougher, and the flowing of the metal gives it a surface polish which renders unnecessary machining or grinding its faces. The bicycle-builder puts a number of these wheels on an arbor and mills the teeth. All that it is necessary to do in addition to this to make the wheel in condition for being installed in the bicycle is to drill the holes for the spider-arms and nickel-plate the wheel, giving it the preparatory buffing usual in the nickel-plating operation.

The apparatus may be modified so as to produce a wheel of different contour from that shown without departing from my invention. I therefore do not wish to be understood as limiting myself to the specific apparatus described.

I claim—

1. A pair of coöperating dies for making metal wheels, one of which dies has a plain annular surface, and a groove depressed within such surface, the other of which dies has a complementary plain annular surface, and means for directing said dies into proper presentation to each other, whereby said complementary annular surfaces are adapted to compress between them a wheel-blank, substantially as set forth.

2. A pair of coöperating dies for making metal wheels, one of said dies having a plain annular surface and a groove depressed between said surface, the other of said dies having a similar plain annular surface, one of said dies having a pilot, and the other a coöperating hole, substantially as set forth.

3. A pair of coöperating dies for making sheet-metal wheels, one of said dies having a plain annular surface, and a groove cut within the inner periphery of said surface, said die also having a raised pilot, the other die having a complementary plain annular surface and an opening in which said pilot may enter, substantially as set forth.

4. A pair of coöperating dies for making metal wheels, one of said dies having a plain annular surface, a beveled surface slantingly depressed outwardly from said plain annular surface, a second plain surface surrounding said beveled surface and depressed below the level of said first plain surface and having a raised annular flange lying outside of said second plain surface, the other die having a complementary plain surface, a complementary beveled surface, a second complementary plain surface and a complementary outer annular flange, substantially as set forth.

5. A pair of coöperating dies for making metal wheels, one of said dies having an inner annular groove, a raised plain annular surface without said groove, a raised annular flange without said annular surface, a depressed annular surface and a beveled annular surface connecting said flange and said plain annular surface, said second die having an inner plain annular surface, and raised flange, depressed plain annular, and annular beveled surfaces, complementary to the like respective surfaces of said first die, substantially as set forth.

6. A pair of coöperating dies for use in the manufacture of sprocket-wheels which have web and rim portions, one of said dies, having an annular surface adapted to fit snugly within the web of a sprocket-wheel, and having blocks adapted to fit the space between the web and rim of the sprocket, and having an outer curved wall, substantially as set forth.

7. A pair of coöperating dies for use in the manufacture of sprocket-wheels which have web and rim portions, one of said dies, having an inner cylindrical surface, segmental blocks, and an outer curved wall, the other of said dies having an inner plain annular surface and an outer curved wall, substantially as set forth.

8. A pair of coöperating dies for use in the manufacture of sprocket-wheels which have web and rim portions, one of said dies having a central pilot, an inner cylindrical plain surface, intermediate block-surface and an outer curved wall, the other of said dies having an inner pilot opening an outer curved wall and an intermediate plain surface, substantially as set forth.

9. A pair of coöperating dies for use in the manufacture of sprocket-wheels which have web and rim portions, one of said dies having an inner annular plain surface adapted to block the center of the web, having block-surfaces adapted to fit the space between web and rim, having a depressed beveled surface outside of said block-surface, having a depressed plain surface outside of said beveled surface, and having a curved surface outside of said last-mentioned plain surface, the other of said dies having surfaces similar to the three last-mentioned surfaces and having an inner plain surface, substantially as set forth.

10. A pair of coöperating dies for use in the manufacture of sprocket-wheels which have web and rim portions, one of said dies having a raised pilot, an outer curved surface, a cylindrical surface adjacent to said pilot, block-surfaces outside of said cylindrical surface and beveled and plain surfaces intermediate of said block-surface and curved surface, the other of said dies provided with a central pilot-opening, an inner plain surface, a beveled surface outside of said plain surface, a depressed plain surface outside of said beveled surface and an outer curved surface, substantially as set forth.

In testimony whereof I affix my signature in presence of two witnesses.

NEFF E. PARISH.

Witnesses:
ALBERT H. BATES,
E. L. THURSTON.